United States Patent Office 3,061,145
Patented Oct. 30, 1962

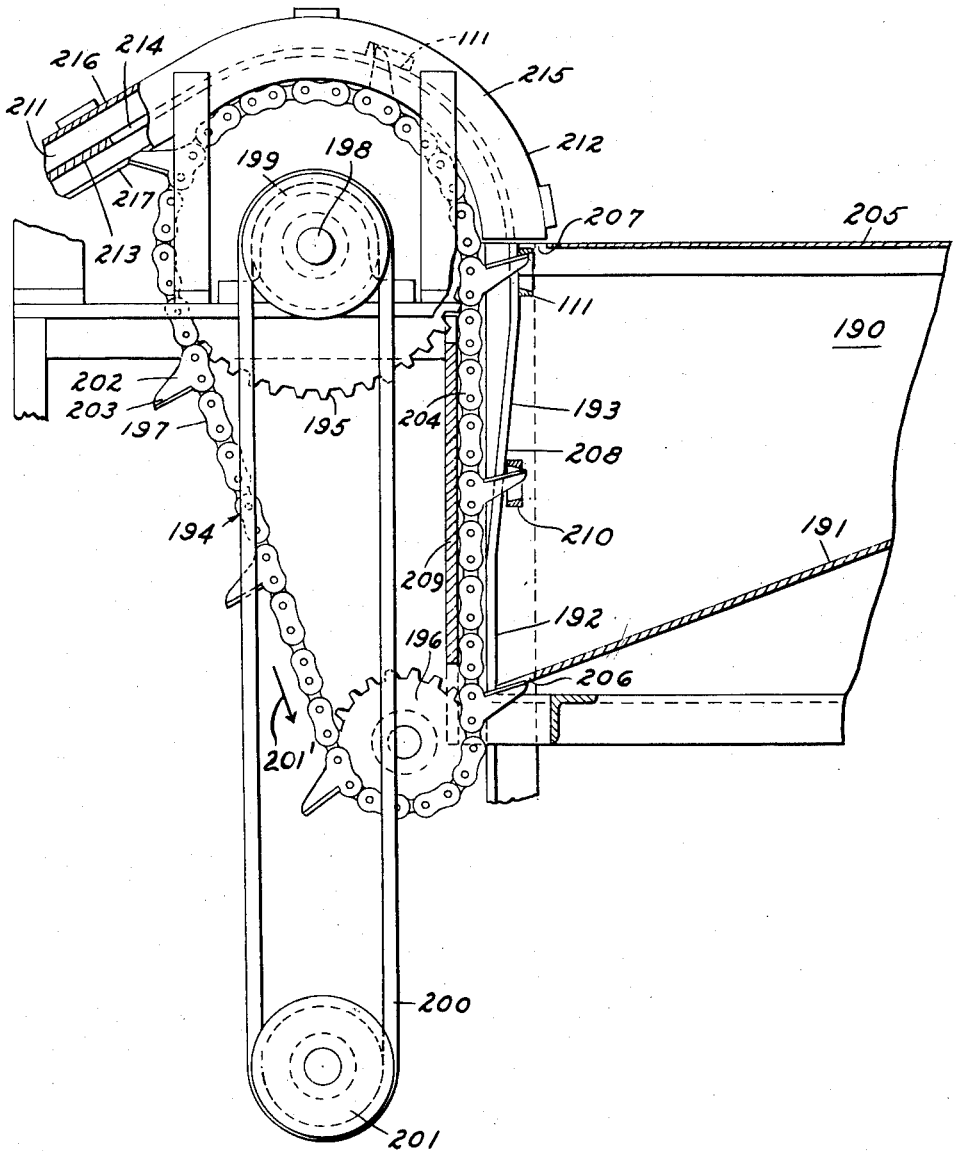

3,061,145
HOPPER WITH MECHANISM FOR FEEDING PROPERLY ORIENTED ANNULAR ARTICLES
Frederick P. Sharpe, Dearborn, Mich., assignor to Kelsey-Hayes Company, Detroit, Mich., a corporation of Delaware
Original application Apr. 8, 1957, Ser. No. 651,209, now Patent No. 2,983,999, dated May 16, 1961. Divided and this application Jan. 19, 1959, Ser. No. 787,632
3 Claims. (Cl. 221—166)

This invention relates generally to hoppers and refers more particularly to a hopper and associated mechanism for storing tapered bearing cups or the like and placing them properly oriented into a chute through which they may be delivered to a utilization device such as a bearing cup inserting machine.

In keeping with the present trend toward automation in manufacturing, apparatus has been developed which automatically secures wheel hubs and brake drums together while simultaneously assembling therewith a plurality of studs and a pair of tapered bearing cups. Such apparatus is disclosed in applicant's co-pending application, Serial Number 651,209, filed April 8, 1957, now Patent No. 2,983,999, May 16, 1961, of which application the present application is a division. In conjunction with such apparatus it is desirable to provide means for storing the bearing cups in close proximity to the particular part of the apparatus utilizing them and to to provide automatic means for delivering the bearing cups properly oriented from the storage means to the utilizing apparatus.

It is therefore one of the objects of the present invention to provide means for storing and automatically delivering to utilizing apparatus properly oriented annular members having a tapered interior surface.

Another object is to provide a hopper for storage of tapered annular members and means for automatically delivering the annular members properly oriented from the hopper to a utilizing device.

Another object is to provide a hopper for storage of tapered bearing cups and means including a driven endless chain having fingers protruding therefrom and a chute bent to a radius and having a slot at one end thereof operatively associated with a vertical slot in the hopper for delivering a properly oriented tapered bearing cup from the hopper to a utilizing device.

More specifically it is an object to provide a hopper for storage of bearing cups having axially tapered, radially inner surfaces and means for removing the bearing cups from the hopper including a driven endless chain having fingers extending therefrom, a portion of the chain extending in vertical direction in close relation to said hopper, the fingers on said chain being moved upwardly and operatively associated with a vertical slot in said hopper to pass within the slot and engage bearing cups stored therein, lift properly oriented bearing cups out of the hopper and deposit them in a chute for delivering to a utilizing device.

With these and other objects in view, the invention resides in the novel features of construction and combination of parts as more fully hereinafter set forth.

In the drawings:
The FIGURE is a side elevation partly in section of a hopper and delivering means according to the invention.

With reference to the drawing a hopper 190 is provided for the storage of bearing cups 111. Mechanism, generally indicated 194 is provided operably associated with hopper 190 for automatically removing properly oriented bearing cups 111 from hopper 190 and depositing them in chute 211. Chute 211 is positioned as shown with respect to the mechanism indicated at 194 and functions to remove the bearing cups 111 lifted from hopper 190 by mechanism 194 and provide a guide through which the bearings may pass by gravity to a utilization device.

The hopper formed as shown in the FIGURE has an inclined bottom wall 191 which slopes downwardly toward the front wall 192. The front wall 192 is provided with a vertical slot 193 which is of a width less than the axial length of the bearing cups 111 so that the bearing cups stored within the hopper 190 cannot escape through the slot.

Mechanism 194 comprises a pair of sprockets 195 and 196 around which extends a link chain 197. A shaft 198 rigidly mounts sprocket 195 and a pulley 199. A belt 200 extends over pulley 199 and another pulley 201. The pulley 201 is driven by a suitable source of power not shown to move chain 197 in the direction of arrow 201'.

The chain 197 is provided along its length with a plurality of spaced members 202 having outwardly projecting fingers 203 of a width sufficiently small to enter the slot 193 in hopper 190. The sprockets 195 and 196 are arranged to provide a vertical length of chain 204 between the sprockets disposed adjacent to the front of the hopper so that the fingers 203 will project into the hopper through slot 193. The bottom wall 191 and top wall 205 of the hopper are slotted at 206 and 207 respectively to clear the fingers. The bottom slot is narrower than the axial length of the bearing cups 111 and shorter than the diameter thereof.

The front wall 192 of hopper 190 has a rearwardly and upwardly inclined section 208. A vertical guide plate 209 is provided to back up the chain 197 in the area indicated 204 and particularly the members 202 to maintain them in the upright position illustrated in which the top surfaces of the fingers 203 are inclined upwardly and rearwardly at an angle to the horizontal substantially less than 45°. The members 202 press hard against plate 209 and are thus prevented from turning. As a result, a bearing cup 111 picked up by one of the fingers 203 will be cammed to the free end of the finger by the inclined front wall section 208. A bearing cup which is picked up by a finger must be oriented with its frustoconical inner surface tapering radially inwardly in a forward direction in order to be carried from the hopper 190 by the finger 203. Bearing cups which are not so oriented, as for example the bearing cup 210, will drop off the finger and fall back into the hopper. As a result, the bearing cups 111 delivered to the chute 211 and hence to the utilization device are properly oriented.

The chute 211 is formed by the tube 212 above a separating partition 213. The separating partition 213 extends from one side to the other of the tube and has a central slot 214 extending in continuation of the slot 193 in the front wall of the hopper. Thus the bearing cups are carried from the hopper into the arcuate section 215 of the tube 212 by the fingers, slot 214 clearing the fingers.

The bearing cups thereafter slide by gravity down the inclined section 216 of the tube through chute 211 to a utilizing device such as a bearing cup assembling mechanism. The tube 212 has a longitudinal slot 217 in the under side for clearing the fingers 203. The chute portion 211 of the tube 212 closely receives the bearing cups so they cannot turn over as they slide along. The chute 211 may have a twisted section to invert the bearing cups as they are delivered so that they will be in an inverse manner to that indicated in the drawing on arrival at the utilization device.

In operation bearing cups are placed in hopper 190 and pulley 201 is caused to rotate whereby chain 197 is caused to move on sprockets 195 and 196 in the direction of the arrow 201'. The fingers 203 on chain 197 therefore pass upward through slot 206 into hopper 190 along slot 193. Due to the inclined bottom 191 of hopper 190 any bearing cups within hopper 190 will tend to rest against the front wall 192 of the hopper. As fingers 203 pass through hopper 190 bearing cups resting against wall 192 are randomly engaged thereby and lifted vertically along the wall. Providing the bearing cup has assumed a correct orientation in engaging the finger as shown at 111 it will be lifted by the finger through slot 207 in top wall 205 into tube 212 of chute 211 and as sprocket 195 rotates, the bearing cup will be disengaged from the finger through the action of separating partition 213 leaving the properly oriented bearing cup in chute 211 to be delivered by gravity to a utilization device. Should the bearing cup assume an undesirable orientation in engaging the finger it will be caused to drop from the finger back into the hopper by the inclined portion of the front wall of the hopper 208 as the finger moves upward.

What I claim as my invention is:

1. A hopper adapted to contain a supply of annular members having axially tapered frusto-conical radially inner surfaces, means for removing the members from said hopper including a linear member and a plurality of fingers carried by said linear member in spaced relation along the length thereof and extending outwardly thereof, said linear member being supported for longitudinal movement in an upward direction along a vertical path such that the outer ends of said fingers successively extend within and pass through said hopper, said fingers being adapted to extend within the annular members to support the annular members thereon during upward movement of said linear member, the upper surfaces of said fingers, when said fingers travel said vertical path, being inclined from their outer ends downwardly at an angle to the horizontal corresponding to the angle of taper of the frusto-conical radially inner surfaces of the annular members, and a guide adjacent said vertical path having an elongated generally upright stripping portion inclined outwardly relative to said fingers in an upward direction, the lower end of said stripping portion of said guide being spaced inwardly from the outer ends of the passing fingers a distance greater than the thickness of the annular members, the upper end of said stripping portion being the outermost portion thereof and being spaced inwardly from the outer ends of the passing fingers a distance less than the thickness of the annular members so that said stripping portion of said guide will engage and strip from said fingers annular members whose radially inner surfaces taper toward the axes thereof in an outward direction relative to said fingers as said fingers move upwardly past said stripping portion of said guide.

2. The hopper defined in claim 1 wherein the angle of the upper surfaces of said fingers to the horizontal, when said fingers travel said vertical path, as well as the angle of taper of the frusto-conical radially inner surfaces of the annular members, is substantially less than 45°.

3. The hopper defined in claim 2 wherein said guide has an elongated straight vertical portion projecting upwardly from the upper end of the stripping portion thereof.

References Cited in the file of this patent

UNITED STATES PATENTS

| | | |
|---|---|---|
| 320,503 | Richards | June 23, 1885 |
| 582,988 | Hoyte et al. | May 18, 1897 |
| 1,095,192 | Curtis | May 5, 1914 |
| 1,182,183 | Lilley | May 9, 1916 |
| 1,396,116 | Hultgren | Nov. 8, 1921 |
| 1,440,744 | Phillippe | Jan. 2, 1923 |
| 2,543,244 | Klooz et al. | Feb. 27, 1951 |
| 2,889,960 | Brancato et al. | June 9, 1959 |
| 2,892,567 | Smith et al. | June 30, 1959 |